(12) United States Patent
Mifsud et al.

(10) Patent No.: US 10,035,468 B2
(45) Date of Patent: Jul. 31, 2018

(54) CLAMPING RACK

(71) Applicants: Thomas Mifsud, Auburn, WA (US); David Ramsey, Corpus Christi, TX (US); Brian Stenger, Big Horn, WY (US)

(72) Inventors: Thomas Mifsud, Auburn, WA (US); David Ramsey, Corpus Christi, TX (US); Brian Stenger, Big Horn, WY (US)

( * ) Notice: Subject to any disclaimer, the term of this patent is extended or adjusted under 35 U.S.C. 154(b) by 0 days.

(21) Appl. No.: 15/470,792

(22) Filed: Mar. 27, 2017

(65) Prior Publication Data

US 2017/0217379 A1 Aug. 3, 2017

(51) Int. Cl.
| | |
|---|---|
| *B60R 9/00* | (2006.01) |
| *B60R 9/058* | (2006.01) |
| *B60R 9/045* | (2006.01) |
| *B60R 9/06* | (2006.01) |
| *B60R 7/14* | (2006.01) |
| *B60R 9/048* | (2006.01) |
| *B60R 11/06* | (2006.01) |
| *B60R 9/08* | (2006.01) |

(52) U.S. Cl.
CPC .............. *B60R 9/058* (2013.01); *B60R 7/14* (2013.01); *B60R 9/045* (2013.01); *B60R 9/048* (2013.01); *B60R 9/06* (2013.01); *B60R 11/06* (2013.01); *B60R 9/08* (2013.01)

(58) Field of Classification Search
CPC ......... B60R 9/059; B60R 9/045; B60R 9/048; B60R 9/06; B60R 9/08; B60R 7/14; B60R 11/06

USPC ........................................................ 224/401
See application file for complete search history.

(56) References Cited

U.S. PATENT DOCUMENTS

| | | | | |
|---|---|---|---|---|
| 5,186,585 A | * | 2/1993 | Sousa | A61G 3/0808 188/2 F |
| 5,338,016 A | * | 8/1994 | Howard | B25B 1/103 269/208 |

(Continued)

OTHER PUBLICATIONS

"ATV UTV 4 Wheeler Bow Gun Utility Holder Rack" version 1, downloaded from internet website: http://www.gator-gripp.com/Gallery.html on Mar. 27, 2017.

*Primary Examiner* — Peter Helvey
(74) *Attorney, Agent, or Firm* — Quickpatents, LLC; Kevin Prince

(57) ABSTRACT

A clamping rack for securing an item to an object includes an elongated base member having two ends that each have a rear support surface projecting upwardly therefrom. At least one bottom support projects upwardly from the base member and has a bottom support surface oriented orthogonal to the rear support surfaces. Two pivot members each have an item engagement end with an upwardly projecting front support surface, and a tensioner engagement end, a tensioner fixed between each tensioner engagement ends to urge the tensioner engagement ends mutually closer. A handle member is fixed between the engagement ends and is pulled forward to pivot the front support surfaces away from the rear support surface to make room for the item to be placed therebetween. The item is clamped between the rear and front support surfaces when the handle member is released due to the resiliency of the tensioner.

14 Claims, 4 Drawing Sheets

(56) References Cited

U.S. PATENT DOCUMENTS

| | | | | |
|---|---|---|---|---|
| 5,595,333 | A * | 1/1997 | Boston | B60R 7/14 211/60.1 |
| 5,791,610 | A * | 8/1998 | Sanchez | F41B 5/14 224/916 |
| 6,199,734 | B1 * | 3/2001 | Meeks | B60R 9/08 224/401 |
| 6,457,618 | B1 * | 10/2002 | Hancock | B60R 7/14 224/319 |
| 6,484,913 | B1 * | 11/2002 | Hancock | B60R 7/14 211/64 |
| 6,554,264 | B1 * | 4/2003 | Alford | B25B 1/103 269/147 |
| 6,641,014 | B2 * | 11/2003 | McNalley | B60R 7/14 224/281 |
| 7,296,959 | B2 * | 11/2007 | Davis | B60R 9/06 224/401 |
| 7,559,444 | B1 * | 7/2009 | Church | B60R 7/14 224/401 |
| 9,120,427 | B1 * | 9/2015 | Wolski | B60R 5/04 |
| 2002/0060232 | A1 * | 5/2002 | Stenger | B60R 7/14 224/401 |
| 2003/0038150 | A1 * | 2/2003 | Williams | B60R 7/14 224/401 |
| 2009/0090758 | A1 * | 4/2009 | Bartholdy | B60R 7/14 224/571 |
| 2011/0198375 | A1 * | 8/2011 | Bennett | B60R 7/14 224/401 |
| 2012/0000949 | A1 * | 1/2012 | Williams, Jr. | B60R 7/14 224/401 |
| 2012/0091178 | A1 * | 4/2012 | Hancock | B60R 9/06 224/401 |
| 2014/0097222 | A1 * | 4/2014 | Robinson | B60R 7/14 224/401 |

* cited by examiner

CLAMPING RACK

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to storage and transportation racks, and more particularly to a spring-biased universal clamping rack.

DISCUSSION OF RELATED ART

Clamping or holding racks for holding items such as shovels, fishing poles, rifles, sporting equipment, and the like to an object such as a vehicle are known in the art. However most racks for such equipment have complicated clamping mechanisms that require two hands to operate. Further, such prior art products are prone to either damaging the items by clamping too strongly, or failing to clamp the item securely enough.

Therefore, there is a need for a clamping rack device that can be opened with one hand while the other hand is used to place and position the item in a rack. Such a needed invention would securely hold the items in place on the rack, even when the rack is jolted, but would include enough contact surface area with the item to inhibit damaging or marring the item. Such a needed invention would be relatively inexpensive to manufacture, collapsible for efficient storage and transportation, and easy to install and use. The present invention accomplishes these objectives.

SUMMARY OF THE INVENTION

The present device is a clamping rack for securing an item, such as a tool, firearm, or other equipment, to an object, such as a vehicle, building structure, or the like. A rigid, elongated base member has two opposing ends that each have an item rear support surface projecting upwardly therefrom and adapted to contact the item.

At least one foot projects downwardly from the base member and has at a lower end thereof a mounting mechanism adapted for mounting to the object. Preferably the mounting mechanism of the at least one foot includes a plurality of apertures through the at least one foot and a plurality of mechanical fasteners, such as threaded bolts, rivets, or the like.

At least one bottom support projects upwardly from the base member and has an item bottom support surface oriented substantially orthogonal to the item rear support surfaces of the base member. The at least one item bottom support surface is adapted for contacting the item.

A pair of pivot members each have an item engagement end and an opposing tensioner engagement end. Each pivot member pivots at a pivot with the base member such that the item engagement end is proximate to one of the opposing ends of the base member. The item engagement end of each pivot member terminates in an upwardly projecting item front support surface that is adapted for contacting the item.

A tensioner is fixed between the tensioner engagement ends of each pivot member and is adapted to urge the tensioner engagement ends of each pivot member mutually closer. The tensioner terminates at opposing ends, and is preferably made from an elastomeric material, a coiled spring material, or the like. A handle member is fixed between the item engagement end of each pivot member and is made from a substantially non-elastic material, such as a nylon strap material, or the like.

As such, with the mounting mechanism of the at least one foot mounted to the object, the handle member can be pulled forward away from the base member to pivot the item engagement ends and item front support surfaces forward away from the item rear support surface. This makes room for the item to be placed between the item rear and front support surfaces while forcing the tensioner engagement ends apart to stretch the tensioner. The item, once placed onto the bottom support surface between the item rear and front support surfaces, is clamped between the item rear and front support surfaces when the handle member is released, which causes the tensioner to pull the tensioner engagement ends of each pivot member together.

The present invention is a clamping rack device that can be opened with one hand while the other hand is used to place and position the item in a rack. The present device securely holds the items in place on the rack, even when the rack is jolted, and includes enough contact surface area with the item to inhibit damaging or marring the item. The present invention is relatively inexpensive to manufacture, collapsible for efficient storage and transportation, and easy to install and use. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
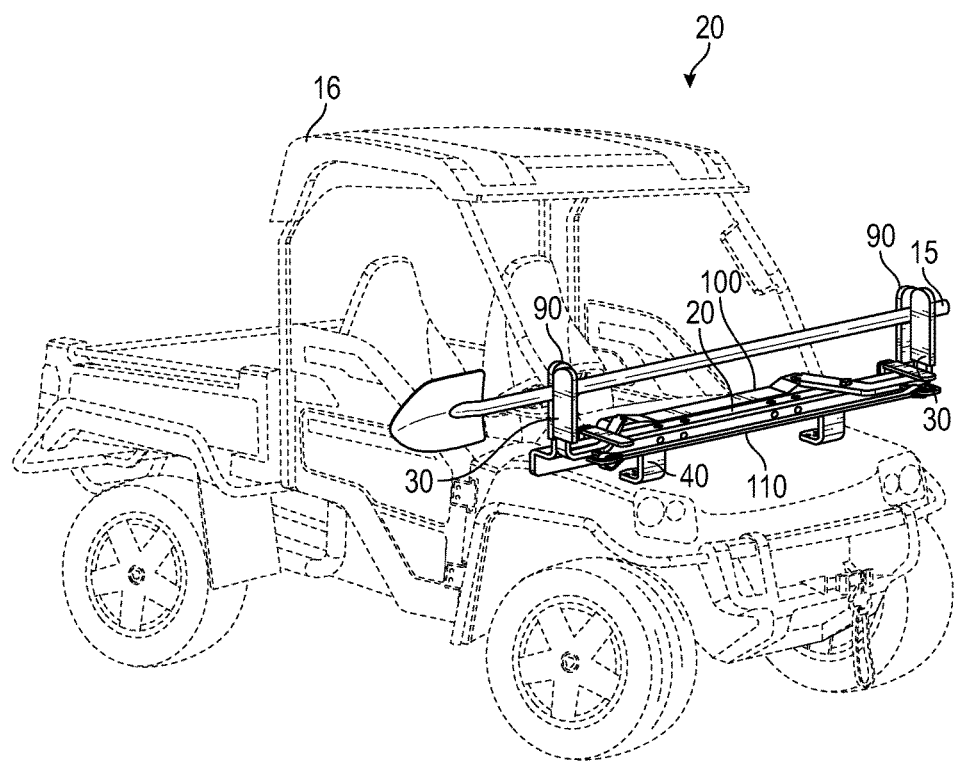
FIG. 1 is a perspective view of the invention, illustrated as mounted to a vehicle.
Figure 2:
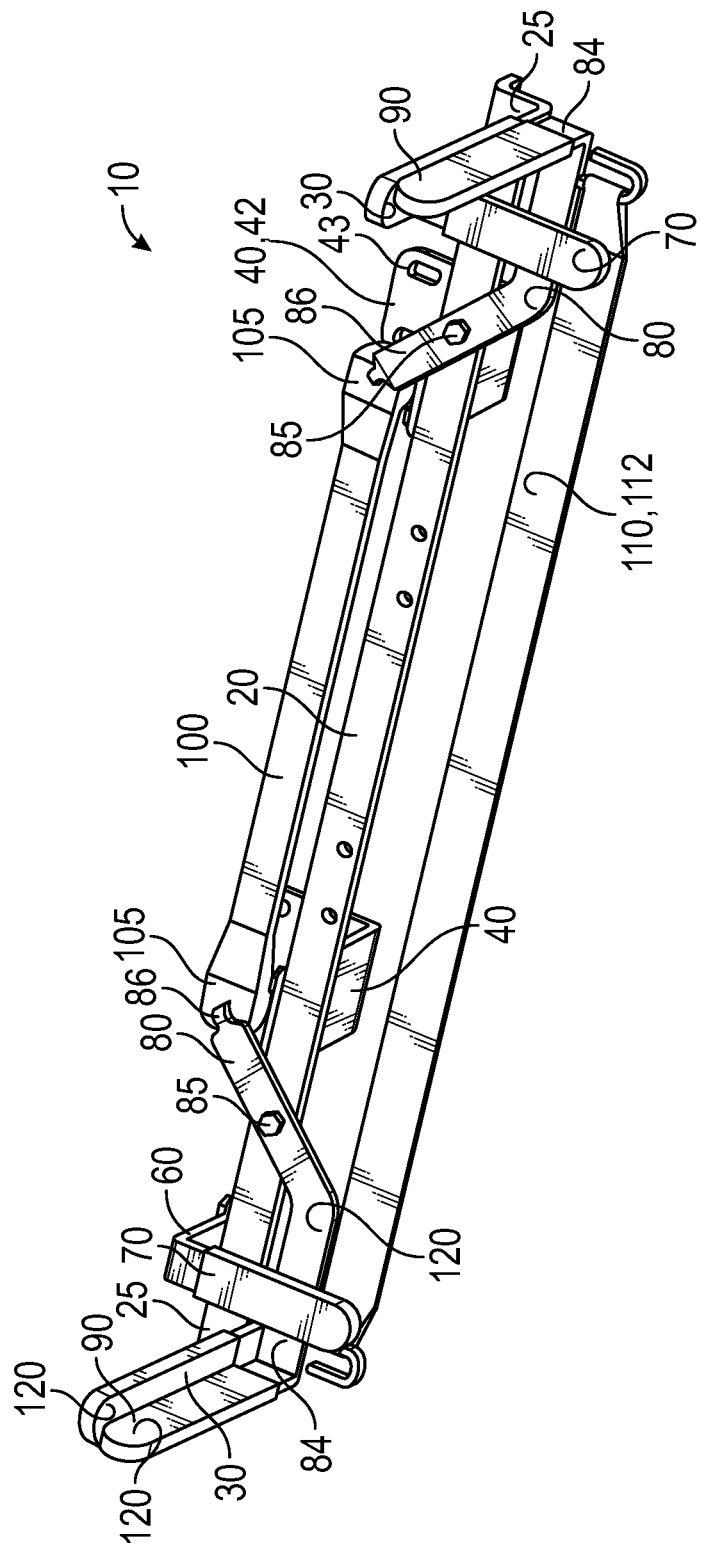
FIG. 2 is a top perspective view of the invention, illustrated in a fully closed position.
Figure 3:
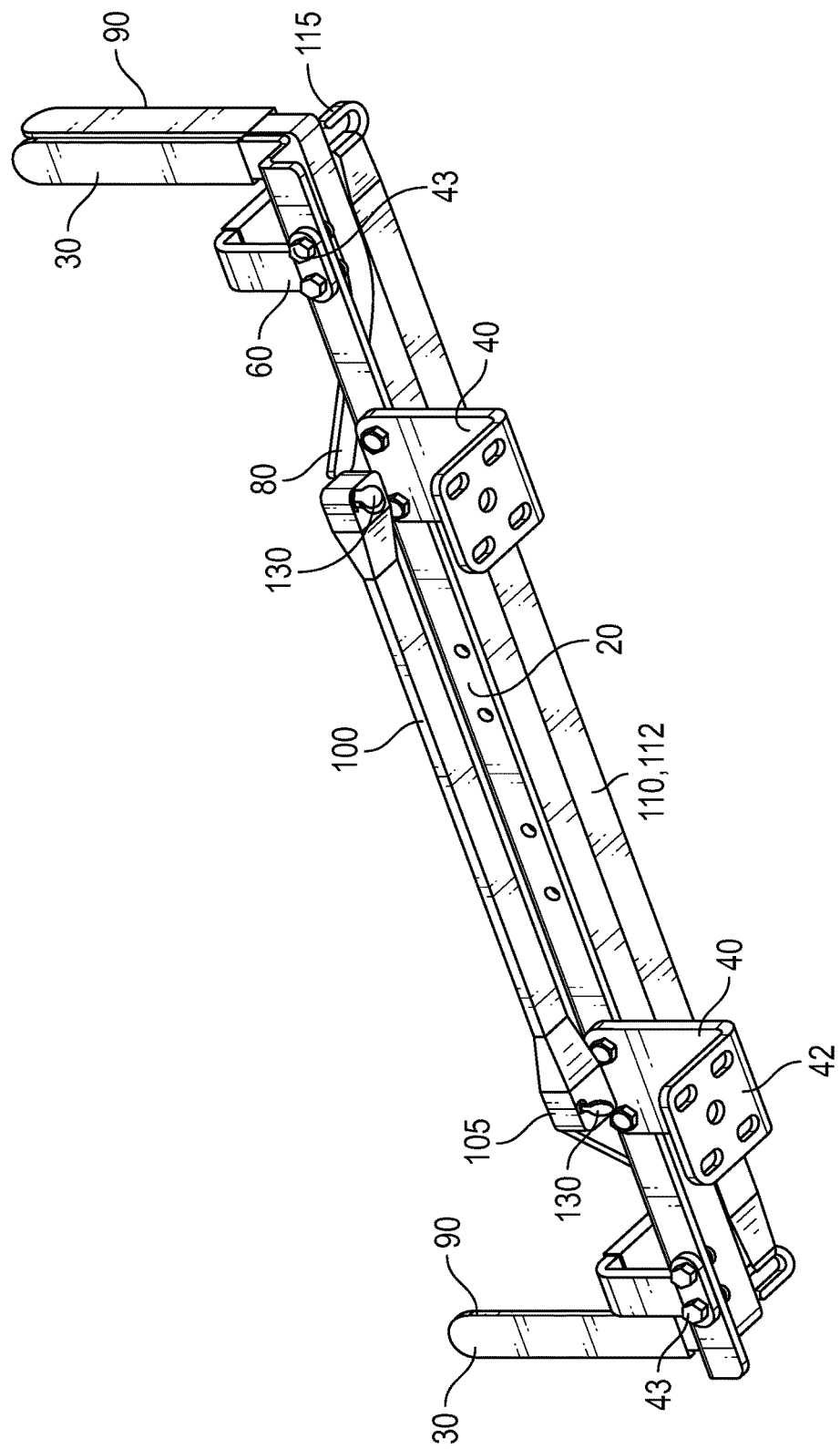
FIG. 3 is a bottom perspective view of FIG. 2.
Figure 4:
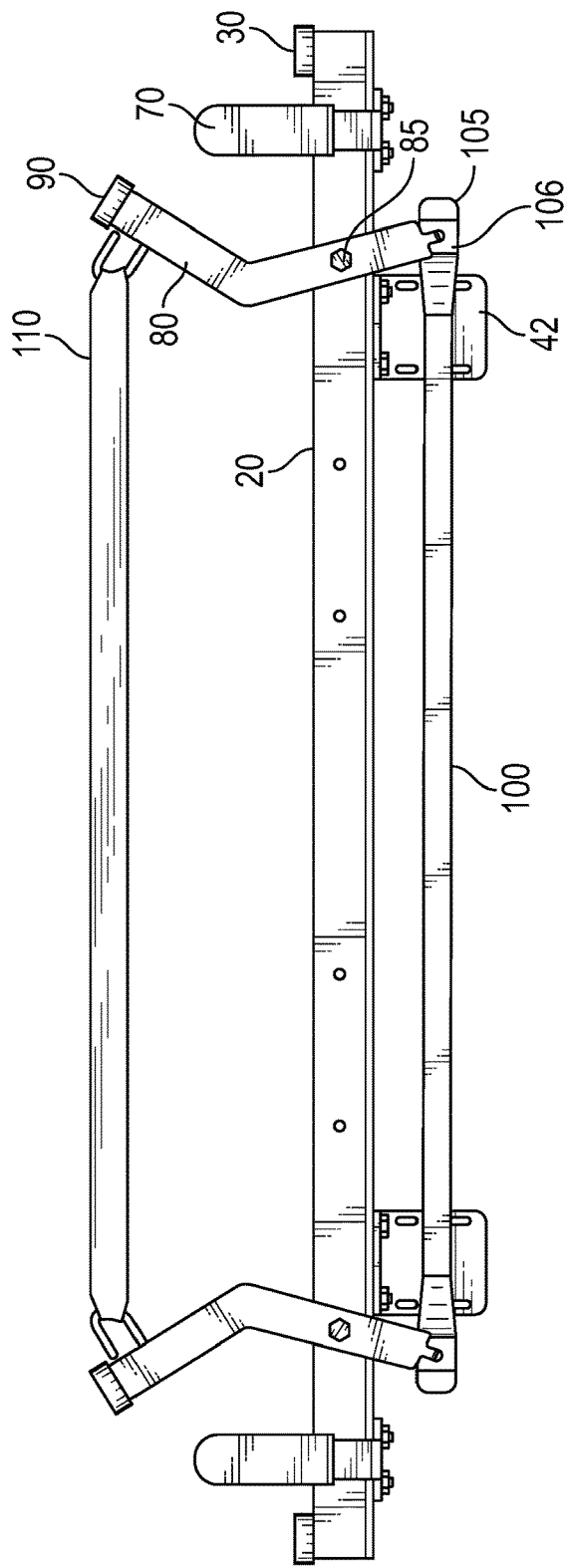
FIG. 4 is a top plan view of the invention, illustrated in an open position.

FIGS. 1-4 illustrate a clamping rack 10 for securing an item 15, such as a tool, firearm, or other equipment, to an object 16, such as a vehicle, building structure, or the like.

A rigid, elongated base member 20 has two opposing ends 25 that each have an item rear support surface 30 projecting upwardly therefrom and adapted to contact the item 15. Preferably the elongated base member 20 is made from an elongated flat metal sheet bent at 90-degrees. Preferably each item rear support surface 30 of the base member 20 is selectively repositionable on the base member 20 with a pair of mechanical fasteners 140, such as threaded bolts and nuts, or the like.

At least one foot 40 projects downwardly from the base member 20 and has at a lower end 42 thereof a mounting mechanism 50 adapted for mounting to the object 16. Preferably the mounting mechanism 50 of the at least one foot 40 includes a plurality of apertures 43 through the at least one foot 40 and a plurality of mechanical fasteners 44, such as threaded bolts, rivets, or the like. Preferably the clamping rack 10 includes two of the feet 40 proximate the opposing ends 25 of the base member 20. In one embodiment each foot 40 is selectively repositionable on the base member 20 with a pair of mechanical fasteners 140, such as threaded bolts and nuts, or the like. Preferably the at least one foot 40 is formed from a strong flat metal stock material.

At least one bottom support 60 projects upwardly from the base member 20 and has an item bottom support surface 70 oriented substantially orthogonal to the item rear support surfaces 30 of the base member 25. The at least one item bottom support surface 70 is adapted for contacting the item 15.

A pair of pivot members 80 each have an item engagement end 84 and an opposing tensioner engagement end 86. Each pivot member 80 pivots at a pivot 85 with the base member 20 such that the item engagement end 84 is proximate to one of the opposing ends 25 of the base member 20. The item engagement end 84 of each pivot member 80 terminates in an upwardly projecting item front support surface 90 that is adapted for contacting the item 15. Preferably each pivot member 80 is made from a strong flat metal material.

A tensioner 100 is fixed between the tensioner engagement ends 86 of each pivot member 80 and is adapted to urge the tensioner engagement ends 86 of each pivot member 80 mutually closer. The tensioner 100 terminates at opposing ends 105, and is preferably made from an elastomeric material, a coiled spring material, or the like.

A handle member 110 is fixed between the item engagement end 84 of each pivot member 80. Preferably the handle member 110 is made from a substantially non-elastic material, such as a nylon strap material 112, or the like.

As such, with the mounting mechanism 50 of the at least one foot 40 mounted to the object 16, the handle member 110 can be pulled forward away from the base member 20 to pivot the item engagement ends 84 and item front support surfaces 90 forward away from the item rear support surface 30. This makes room for the item 15 to be placed between the item rear and front support surfaces 30,90 while forcing the tensioner engagement ends 86 apart to stretch the tensioner 100. The item 15, once placed onto the bottom support surface 60 between the item rear and front support surfaces 30,90, is clamped between the item rear and front support surfaces 30,90 when the handle member 110 is released, which causes the tensioner 100 to pull the tensioner engagement ends 86 of each pivot member 80 together.

Preferably the item bottom, rear and front support surfaces 60,30,90 each include a cushioning surface 120, such as a plastic cover, an elastomeric cover, or the like, and each item bottom, rear and front support surface 60,30,90 is preferably relatively flat and made of a flat metal stock material.

The tensioner engagement end 84 of each pivot member 80 preferably further includes a post 130 adapted to traverse an aperture 106 at either of the two opposing ends 105 of the tensioner 100. As such, tensioners 100 may be easily interchanged with other tensioners 100 having different elasticities, depending on the item 15 to be held by the clamping rack 10.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A clamping rack for securing an item to an object, comprising:
    an elongated base member having two opposing ends each having an item rear support surface projecting upwardly therefrom and adapted for contacting the item;
    at least one foot projecting downwardly from the base member and having at a lower end thereof a mounting mechanism adapted for mounting to the object;
    at least one bottom support projecting upwardly from the base member and having an item bottom support surface oriented substantially orthogonal to the item rear support surface of the base member and adapted for contacting the item;
    a pair of pivot members each having an item engagement end and an opposing tensioner engagement end, each pivot member pivotally fixed with the base member such that the item engagement end is proximate to one of the opposing ends of the base member, the item engagement end of each pivot member terminating in an upwardly projecting item front support surface adapted for contacting the item;
    a tensioner fixed between the tensioner engagement ends of each pivot member and adapted to urge the tensioner engagement ends of each pivot member mutually closer; and
    a handle member fixed between the item engagement end of each pivot member;
    whereby with the mounting mechanism of the at least one foot mounted to the object, the handle member can be pulled forward away from the base member to pivot the item engagement ends and item front support surface forward away from the item rear support surfaces, thereby making room for the item therebetween and urging the tensioner engagement ends of each pivot member apart to stretch the tensioner, the item then being placed onto the item bottom support surface between the item front and rear support surfaces, the handle member thereafter being released to allow the tensioner to pull the tensioner engagement ends of each pivot members together to cause the item front support surfaces to move towards the item rear support surfaces to clamp the item therebetween.

2. The clamping rack of claim 1 wherein the elongated base member is made from an elongated flat metal sheet bent at 90-degrees.

3. The clamping rack of claim 1 wherein the item bottom, rear and front support surface each include a cushioning surface.

4. The clamping rack of claim 1 wherein the item bottom, rear and front support surface each include an elastomeric cushioning surface.

5. The clamping rack of claim 1 wherein the mounting mechanism of the at least one foot includes a plurality of apertures through the at least one foot and a plurality of mechanical fasteners.

6. The clamping rack of claim 1 wherein the at least one foot is a pair of the feet.

7. The clamping rack of claim 1 wherein the tensioner engagement end of each pivot member includes a post adapted to traverse an aperture at either end of the tensioner, such that the tensioner may be selectively interchanged with a different tensioner.

8. The clamping rack of claim 7 further including a plurality of tensioners each having a different elasticity.

9. The clamping rack of claim 1 wherein the tensioner is made from an elastomeric material.

10. The clamping rack of claim 1 wherein the tensioner is made from a coiled spring metal material.

11. The clamping rack of claim 1 wherein the handle member is a length of nylon strap material.

12. The clamping rack of claim 1 wherein each item rear support surface of the base member is selectively repositionable on the base member with a pair of mechanical fasteners.

13. The clamping rack of claim 1 wherein the at least one foot is selectively repositionable on the base member with a pair of mechanical fasteners.

14. The clamping rack of claim 1 wherein each item support surface is relatively flat and oriented towards the item when the item is engaged with the clamping rack.

* * * * *